United States Patent [19]

Futamura et al.

[11] 4,421,494
[45] Dec. 20, 1983

[54] TRIPOD TYPE CONSTANT VELOCITY UNIVERSAL JOINT

[75] Inventors: Yoshisumi Futamura, Toyota; Shigeki Komeiji, Okazaki; Shuhei Noro, Aichi; Junzo Hasegawa, Obu; Fumio Matsunari, Nagoya; Toshiaki Ikeda, Aichi, all of Japan

[73] Assignees: Toyota Jidosha Kogyo Kabushiki Kaisha; Toyota Chuo Kenky usho Kabushiki Kaisha, both of Aichi, Japan

[21] Appl. No.: 239,464

[22] Filed: Mar. 2, 1981

Related U.S. Application Data

[63] Continuation-in-part of Ser. No. 73,872, Sep. 10, 1979, abandoned.

[30] Foreign Application Priority Data

Sep. 14, 1978 [JP] Japan ............................... 53-113122
Sep. 14, 1979 [EP] European Pat. Off. ........ 79103455.6

[51] Int. Cl.$^3$ .............................................. F16D 3/30
[52] U.S. Cl. .................................... 464/111; 464/123; 464/905
[58] Field of Search ................ 464/111, 115, 123, 905

[56] References Cited

U.S. PATENT DOCUMENTS

| | | | |
|---|---|---|---|
| 3,818,721 | 6/1974 | Wahlmark | 464/111 |
| 3,877,251 | 4/1975 | Wahlmark | 464/111 |
| 4,010,625 | 3/1977 | Orain | 464/111 |
| 4,167,860 | 9/1979 | Sakaguchi et al. | 464/111 |
| 4,175,407 | 11/1979 | Orain | 464/111 |
| 4,178,778 | 12/1979 | Orain | 464/123 X |
| 4,205,539 | 6/1980 | Orain | 464/111 |

*Primary Examiner*—Stuart S. Levy
*Assistant Examiner*—Daniel P. Stodola
*Attorney, Agent, or Firm*—Oblon, Fisher, Spivak, McClelland & Maier

[57] ABSTRACT

A tripod type constant velocity universal joint comprises a driven part having an axis of rotation; a driving part having an axis of rotation; a spider member, integral with one of the parts, having three roller supporting rods extended radially from the concentrated portion thereof with an angle of 120 degrees formed therebetween; three roller elements respectively rotatably supported on the roller supporting rods and slidable along the axial directions of the roller supporting rods; and a pot member, integral with the other of the parts, defining three pairs of roller raceways. The longitudinal axis of each pair of roller raceways symmetrically approaches along straight lines a rotational axis of the pot member on both sides of the roller raceways in their longitudinal direction. The tripod type constant velocity universal joint of the present invention decreases the quantities of nonconstant rotational velocity by decreasing the difference of the pitch radiuses of the portions at which two adjacent roller elements are respectively located between the pairs of roller raceways, and reduces the size and weight thereof.

14 Claims, 20 Drawing Figures

FIG. 14

| CASE | MODIFICATION PATTERN | DATA | REMARKS |
|---|---|---|---|
| 0 | | $R_0 = 19.9$ mm<br>$\overline{NP} = 5.24$ mm<br>$\theta_0 = 6.2°$ | CONVENTIONAL TYPE, ONE SIDE MODIFICATION |
| 1 | | $R_0 = 19.9$ mm<br>$NP_1, NP_2 = 5.24$ mm<br>$\theta_0 = 6.2°, \delta = 0.08 R_0$ | THE MODIFICATION OF CASE 0 IS EFFECTED SYMMETRICALLY WITH RESPECT TO THE NEUTRAL POINT |
| 2 | | $R_0 = 19.9$ mm<br>$r = 121.23$ mm<br>$\delta = 0.08 R_0$ | THREE POINTS S, N & T IN CASE 1 ARE CONNECTED BY ONE ARC |
| 3 | | $R_0 = 19.9$ mm<br>$\theta_0 = 4.645°$<br>$\delta = 0.057 R_0$ | THREE POINTS S, N & T IN CASE 1 ARE CONNECTED BY STRAIGHT LINES |
| 4 | | $R_0 = 19.9$ mm<br>$\theta_0 = 6.2°$<br>$\delta = 0.107 R_0$ | ANOTHER EXAMPLE OF CASE 3 |
| 5 | | $R_0 = 20.436$ mm<br>$\theta_0 = 6.2°$<br>$\delta = 0.104 R_0$ | A FURTHER EXAMPLE OF CASE 3 |

| example plane cross-angle γ | $R_o=19.9$, $R=33.75$, 15.898, δ | $R_o=19.9$, θ=13.5°, 15.939, δ | $R_o=19.9$, θ=21°, 15.837, 5.24, δ | $R_o=19.9$, $R=18.1$, 15.845, 5.24, δ |
|---|---|---|---|---|
| | $\delta = 0.2R_o$ $\delta = 3.98$ | $\delta = 0.2R_o$ $\delta = 3.98$ | $\delta = 0.2R_o$ $\delta = 3.98$ | $\delta = 0.2R_o$ $\delta = 3.98$ |
| 11 | 0 | 0.0008 | 0 | 0 |
| 13 | 0.0001 | 0.0012 | 0 | 0.0001 |
| 15 | 0.0001 | 0.0018 | 0 | 0.0002 |
| 17 | 0.0003 | 0.0026 | 0.0027 | 0.0003 |
| 19 | 0.0005 | 0.0036 | 0.0070 | 0.0003 |
| 21 | 0.0010 | 0.0047 | 0.0130 | 0.0002 |
| 23 | 0.0017 | 0.0060 | 0.0143 | 0.0012 |
| 25 | 0.0028 | 0.0074 | 0.0152 | 0.0024 |
| 27 | 0.0045 | 0.0089 | 0.0160 | 0.0039 |
| 29 | 0.0069 | 0.0104 | 0.0165 | 0.0055 |
| 31 | 0.0103 | 0.0120 | 0.0171 | 0.0072 |
| 33 | 0.0151 | 0.0134 | 0.0176 | 0.0088 |
| 35 | 0.0216 | 0.0147 | 0.0182 | 0.0104 |
| 37 | 0.0304 | 0.0158 | 0.0192 | 0.0117 |
| 39 | 0.0420 | 0.0163 | 0.0206 | 0.0126 |
| 41 | 0.0571 | 0.0163 | 0.0227 | 0.0128 |

FIG. 20

TRIPOD TYPE CONSTANT VELOCITY UNIVERSAL JOINT

CROSS REFERENCE TO RELATED APPLICATION

The present application is a continuation-in-part application of our co-pending application Ser. No. 073,872, filed Sept. 10, 1979 for TRIPOD TYPE CONSTANT VELOCITY UNIVERSAL JOINT, and now abandoned.

BACKGROUND OF THE INVENTION

1. Field of the Invention

This invention relates to constant velocity universal joints which transmit rotational motion between driving and driven shafts without changing the angular velocity, and more particularly to a novel tripod type constant velocity universal joint with modified roller races.

2. Description of the Prior Art

A tripod type constant velocity universal joint is known in the art, which comprises a spider member having three roller supporting rods extended radially from the concentrated portion thereof with an angle of 120 degrees formed therebetween, the spider member being connected to a first transmission shaft, which is one of a pair of driving and driven shafts; roller elements respectively rotatably supported on the roller supporting rods in such a manner that the roller elements are movable along the roller supporting rods, respectively; and a pot member having a cylindrical part with pairs of roller raceways which respectively receive the roller elements therebetween, the pot member being connected to a second transmission shaft which is the other of the pair of driving and driven shafts. If, in a constant velocity universal joint of this type, only the constant velocity characteristic is taken into consideration, it is preferable that the roller races (the pairs of roller raceways) are respectively extended in parallel with the rotational axis of the pot member. However, in order to decrease the size of the universal joint and to reduce the weight of the same, it is not always preferable that the roller races are in parallel with the rotational axis of the pot member. In a conventional tripod type constant velocity universal joint put to practical use, in order to reduce the size and weight, the top end portions of the roller races are slightly bent toward the rotational axis of the pot member. That is, they are subjected to so-called "one side modification." This tripod type constant velocity universal joint having its roller races subjected to one side modification is small in size and light in weight when compared with a tripod type constant velocity universal joint having its roller races not modified. However, the former universal joint suffers from a disadvantage that its constant velocity characteristic is impaired.

Namely, the quantities of nonconstant velocity in the rotation of the tripod type universal joint are decided by adding two values obtained by multiplying each difference of pitch radiuses of the portions at which two adjacent roller elements are respectively located between pairs of roller raceways by each value represented by a trigonometric function. In the original tripod type universal joint not having one side modification, as the differences of pitch radiuses of two adjacent roller elements which are respectively located in pairs of roller raceways provided in parallel with respect to the rotational axis of the pot member is zero, the quantities of nonconstant velocity (velocity fluctuation) are therefore also zero.

On the other hand, in the tripod type universal joint having said one side modification, the differences of the pitch radiuses of the portions at which two adjacent roller elements are respectively located in the pairs of roller raceways are increased. For example, one roller element is located at a parallel portion of a pair of roller raceways, and the other roller element is located at a bent portion thereof, so that the quantities of nonconstant velocity are increased according to the increase of the differences.

In order to reduce the size of the three roller type joint relative to the previous one of this type and to provide increased torque carrying capacity, according to Wahlmark (U.S. Pat. No. 3,877,251), it was found that for efficient operation with smallest joint size for given torque capacity, the ratio ($R_o$/r) of torque arm ($R_o$) to track radius (r) should be maintained within the range of 0.75 to 0.90.

In U.S. Pat. No. 3,877,251 to Wahlmark, since the off-set quantity (i.e., $R_o$/r) is maintained within the range of 0.75 to 0.90, an approach quantity of the roller races along an arc lines at both ends thereof is large. Accordingly, in Wahlmark the quantity of nonconstant velocity in the universal joint is increased, for example the quantity of nonconstant velocity is 0.0375 in the plane cross-angle $\gamma=37°$ or 0.0693 in the plane cross-angle $\gamma=41°$, so that the constant velocity characteristic thereof will be lowered without being maintained. Furthermore, as in Wahlmark, the torque arm is 1.25 inches and the track radius is 1.50 inches.

The configuration of the roller races (pairs of roller raceways) of a tripod type constant velocity universal joint greatly affects the general performance thereof. Accordingly, it is considerably important to modify the configuration of the roller races, in order to improve the general performance of the tripod type constant velocity universal joint.

SUMMARY OF THE INVENTION

A primary object of the present invention is to provide a novel tripod type constant velocity universal joint.

Another object of the present invention is to provide a tripod type constant velocity universal joint of which constant velocity characteristic is maintained or unchanged as much as possible.

Still another object of the present invention is to provide a compact tripod type constant velocity universal joint.

A further object of the present invention is to provide a tripod type constant velocity universal joint which can increase the maximum operating joint angle.

A still further object of the present invention is to provide a tripod type constant velocity universal joint in which vibration and noise based on the whirling motion are decreased by reducing the whirling quantity.

It is yet a further object of the invention to provide a tripod type constant velocity universal joint having roller races which are modified in a novel manner so that the size and the weight thereof are less than those of the conventional one while the constant velocity characteristic is maintained or unchanged as much as possible.

The foregoing objects and other objects of the invention have been achieved by the provision of a tripod type constant velocity universal joint as described above in which three pairs of roller raceways which are formed in a pot member for respectively receiving roller elements therebetween are respectively modified in such a manner that a longitudinal axis of each pair of roller raceways symmetrically approaches along straight lines a rotational axis of the pot member on both sides of the roller raceways in their longitudinal direction.

If each pair or roller raceways is symmetrically modified at both end portions thereof in such a manner that the distances between the longitudinal axis of the pair of roller raceways and the rotational axis of the pot member are shorter within a predetermined quantity $\delta$ at both end portions thereof than the distance therebetween at the central portion thereof, i.e., if the pair of roller raceways is subjected to "both-side straight modification," then the nonconstant velocity characteristic attributing to the one side modification is cancelled by the other side modification of the both side modification, to improve the constant velocity characteristic by decreasing the differences of the pitch radiuses of the portions at which two adjacent roller elements are respectively located in the pairs of roller raceways, (for example, one roller element being located at one bent portion of the pair of roller raceways, and the other roller element being located at the other bent portion thereof), and by increasing the frequency of the nonconstant velocity fluctuation and the zero timings of the quantities of nonconstant velocity. Furthermore both of the movement strokes of the roller elements along the roller supporting rods and of the movement strokes thereof along the roller races are improved or shortened with the effect that the size and weight of the universal joint can be reduced.

The roller race may be inwardly bent along straight lines, within a predetermined approach quantity $\delta$ at both ends thereof, symmetrically with respect to a symmetry point which is the neutral point in the central portion of the roller race, i.e. a point (or a tripod joint center) at which the roller element is brought into contact with the roller race when the first and second transmission shafts are on one straight line. That is, the roller race may be subjected to both-side symmetrical modification.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 14 is a tabular representation of 5 types of modification patterns;

FIG. 20 is a tabular representation of four examples shown in FIGS. 11, 12, 10 and 19.

DETAILED DESCRIPTION OF THE PREFERRED EMBODIMENTS

This invention will be described with reference to the accompanying drawings.

Figure 1:
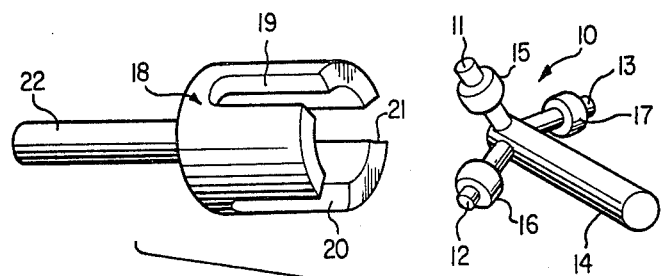
FIG. 1 is a schematic perspective view showing the fundamental structure of a tripod type constant velocity universal joint.

Before the description of a tripod type constant velocity universal joint according to the invention, the constant velocity characteristic of a tripod type constant velocity universal joint and the nonconstant velocity characteristic of a conventional one with a roller race modified on one side will be described with reference to FIGS. 1 through 8. FIG. 1 is a perspective view showing the fundamental structure of the tripod type constant velocity universal joint. The tripod type constant velocity universal joint has a spider member 10. The spider member 10 has three roller supporting rods 11, 12 and 13 extended radially from the concentrated portion thereof in such a manner that the rods form angles of 120° with respect to one another. The spider member 10 is connected to one end of a first transmission shaft 14 (one of driving and driven shafts). Roller elements 15, 16 and 17 each having spherical outer surfaces are rotatably mounted on the roller supporting rods 11, 12 and 13 in such a manner that the roller elements are slidable on the rods, respectively. The roller elements 15, 16 and 17 are engaged with roller races (three pairs of roller raceways) 19, 20 and 21 formed in the cylindrical wall of a substantially cylindrical pot element 18, so that they can rotatably move in the roller races, respectively. In the tripod type constant velocity universal joint of the fundamental structure described above, the roller races are in parallel with the axis of a second transmission shaft 22 (the other of the driving and driven shafts) connected to the pot member 18.

Figure 2:
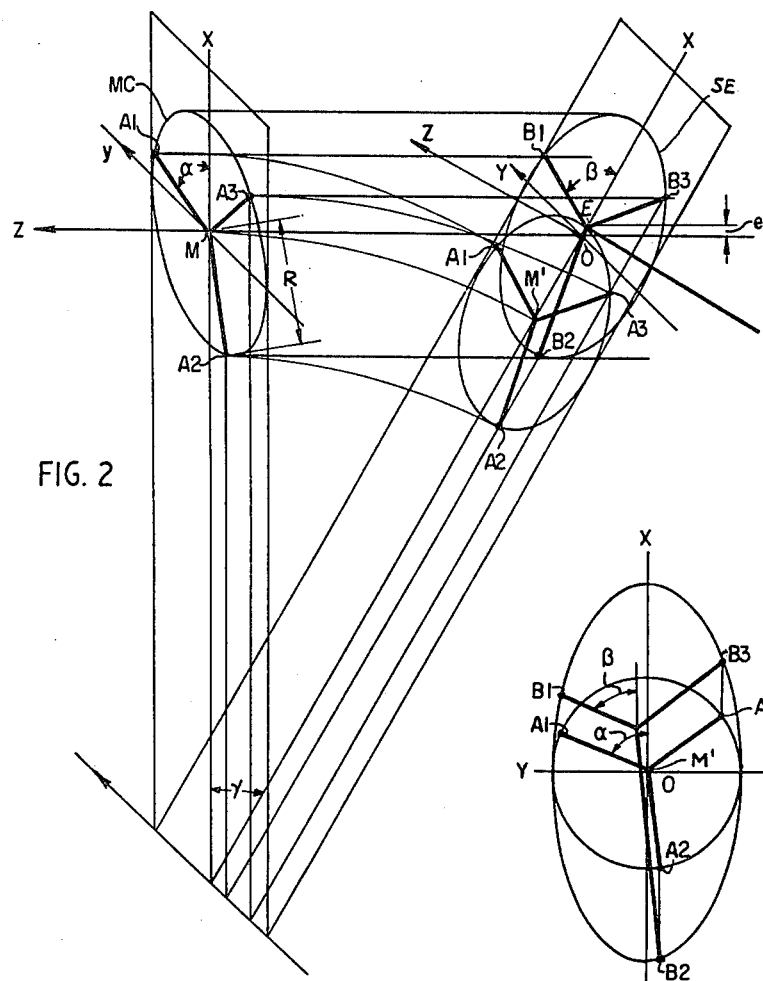
FIGS. 2 and 3 are explanatory diagrams of the motion of the tripod type constant velocity universal joint.

FIG. 2 is a diagram providing a description of the constant velocity characteristic of the above-described tripod type constant velocity universal joint of the fundamental structure. FIG. 2 shows a state of the pot member and the spider member in which the pot member and the spider member are inclined forming a plane cross-angle $\gamma$ with each other with a rotational phase angle $\alpha(\beta)$. In this connection, with the rotational phase angle $\alpha = \beta$, rotational motion is transmitted at constant velocity between the pot member and the spider member.

Figure 3:
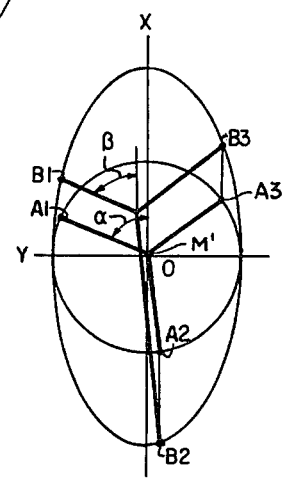

It will be proved that the rotational phase angle $\alpha$ is equal to $\beta(\alpha = \beta)$ in the tripod type constant velocity univeral joint having the fundamental structure described above. In FIG. 2, the centers of the roller races in a plane perpendicular to the axis of the pot member, i.e. in a pot plane, will be designated by $A_1$, $A_2$ and $A_3$, respectively, and a circle whose circumference passes through the three points will be called "a master circle" (MC) having the center M. Then, the mutual cross angles $\overline{A_1M}$, $\overline{A_2M}$ and $\overline{A_3M}$ are each 120°. Furthermore, a length $\overline{A_{1-3}M}$ will be called "a pitch radius R." The centers of the roller elements are on a slave ellipse (SE) obtained by projecting the master circle onto an XY plane, where points $B_1$ through $B_3$ correspond to the points $A_1$ through $A_3$, respectively. Since the points $B_1$ through $B_3$ are on the three roller supporting rods spaced apart by 120° from one another, the connection point E (coincided with the axis of the first transmission shaft) of the three roller supporting rods is, in general, displaced by e from the intersection O of the XY plane, (coinciding with the axis of the second transmission shaft). FIG. 3 shows the case where the master circle is rotated by $\gamma$ around the axis y to be on the XY plane, and the center M' of the master circle thus rotated is moved toward the Y axis so that it is coincided with the intersection O of the XY plane. In FIG. 3, the relation between the rotational phase angles $\alpha$ and $\beta$ is as follows, with the coordinates (a, b) of the roller supporting rod connection point E:

From the relation $(A_{1-3}, B_{1-3})$, the following equations are obtained $$\tan \beta = \frac{R \cdot \sin \alpha - b}{(R \cos \alpha / \cos \gamma - a)} \quad (1)$$

$$\tan \left( \beta + \frac{2}{3} \pi \right) = \frac{R \cdot \sin \left( \alpha + \frac{2}{3} \pi \right) - b}{\left( R \cdot \cos \left( \alpha + \frac{2}{3} \pi \right) / \cos \gamma - a \right)} \quad (2)$$

$$\tan \left( \beta + \frac{4}{3} \pi \right) = \frac{R \cdot \sin \left( \alpha + \frac{4}{3} \pi \right) - b}{\left( R \cdot \cos \left( \alpha + \frac{4}{3} \pi \right) / \cos \gamma - a \right)} \quad (3)$$

From the equations (1) through (3), the following equations are obtained.

$$\alpha = \beta \quad (4)$$

$$a = \frac{1}{2} R \left( 1 - \frac{1}{\cos \gamma} \right) \cos 3\alpha$$

$$b = \frac{1}{2} R \left( 1 - \frac{1}{\cos \gamma} \right) \sin 3\alpha$$

That is, the rotational phase angle $\alpha$ is equal to the rotational phase angle $\beta$. In this case, the amount of eccentricity e is $$\sqrt{a^2 + b^2} = \frac{1}{2} R \left( 1 - \frac{1}{\cos \gamma} \right)$$

As is apparent from the above description, in the tripod type constant velocity universal joint of the fundamental structure having the roller races in parallel with the axis of the pot member, the pitch radius R of the master circle, defined by the distance from the rotational axis of said pot member to the longitudinal axis of each pair of roller raceways, is constant in the axial direction. Therefore, the rotational phase angle $\alpha$ is equal to the rotational phase angle $\beta$ irrespective of the plane cross-angle of the pot member and the spider member; that is, the constant velocity characteristic can be obtained.

Figure 4:
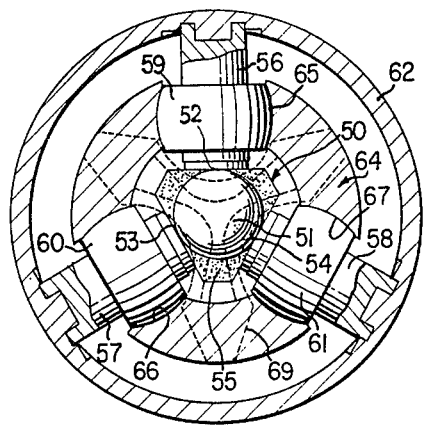
FIG. 4 is a cross sectional view of a conventional tripod type constant velocity universal joint.
Figure 5:
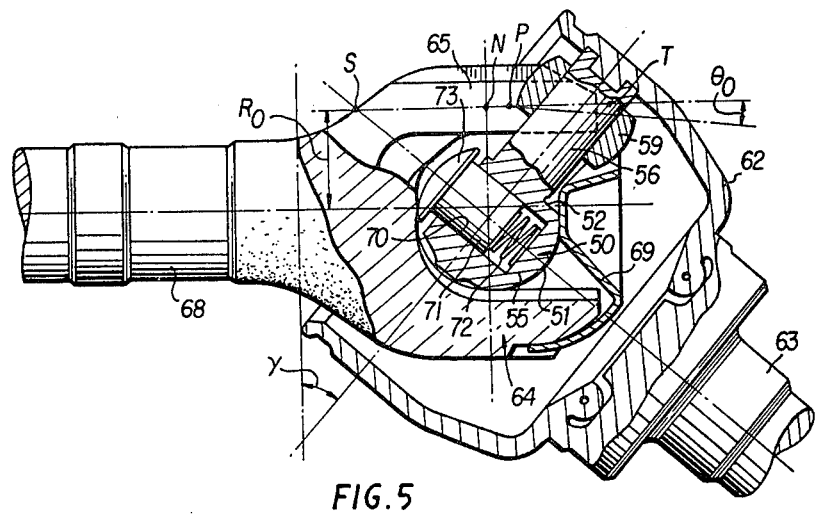
FIGS. 5 and 6 are longitudinal sectional views of the conventional tripod type constant velocity universal joint shown in FIG. 4.
Figure 6:
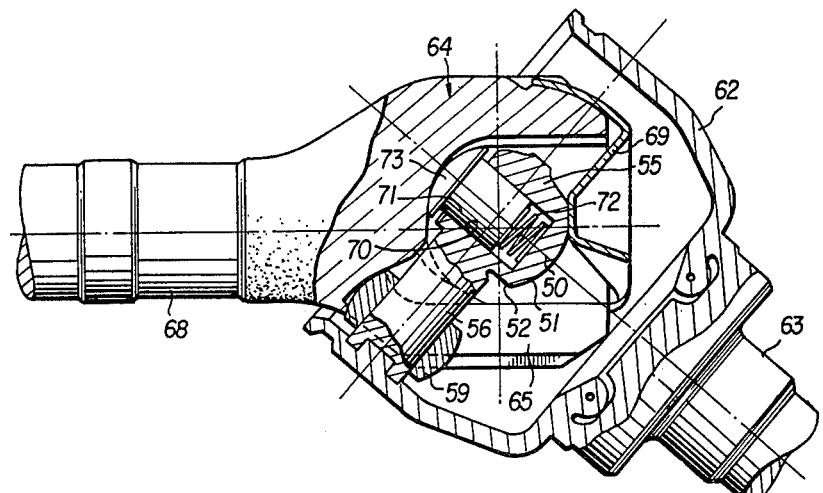
Figure 7:
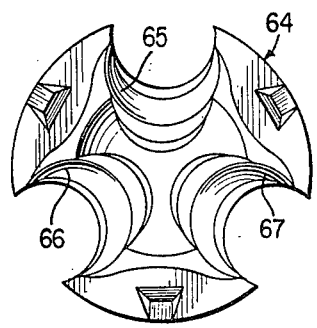
FIG. 7 is a front view of a pot member.

The conventional tripod type constant velocity universal joint is as shown in FIG. 4 through FIG. 7. FIG. 4 is a cross section of the joint with the plane cross-angle (joint angle) $\gamma = 0$. FIG. 5 is a longitudinal section of the joint with the plane cross-angle $\gamma =$ about 40° and the rotational phase angle $\alpha = 0°$. FIG. 6 is a longitudinal section of the joint with the plane cross-angle $\gamma =$ about 40° and the rotational phase angle $\alpha = 180°$. FIG. 7 is a front view of the pot member thereof. The spider member 50 has a central part 55 having a spherical surface 51 and three end faces 52, 53 and 54 and three roller supporting rods 56, 57 and 58 which are respectively radially extended from the three end faces of the central part 55. Roller elements 59, 60 and 61 each having a spherical outer surface are rotatably supported on the roller supporting rods 56, 57 and 58 in such a manner that they can freely move along the rods, respectively. The ends of the roller supporting rods 56, 57 and 58 of the spider member 50 are fixedly secured to the inner wall of a bell-shaped housing 62. A tripod shaft 63 is integrally formed with the housing 62 in such a manner that it is extended from the housing along the axial line passing through the center of the central part 55.

The roller elements 59, 60 and 61 are so designed that they are movable along the roller supporting rods between the end faces of the central part 55 and the inner wall of the housing 62, and are engaged with roller races 65, 66 and 67 formed in the pot member 64; that is, they can rotatably move in the roller races, respectively.

The pot member 64 is called "a tulip member" because of its configuration. A pot shaft 68 is extended from the bottom of the pot part of the pot member 64. The pot part receives the central part 55 of the spider member 50. The end portion of the pot member 64 is provided with a three-legged elastic member 69 which is formed so as to mount over the three pieces, between the above-described roller races, of the pot member, respectively. The three-legged elastic member 69 for preventing the relative sliding of the pot member 64 and spider member 50 in the axial direction thereof has a central portion which is slidably in contact with the spherical surface 51 of the spider member 50. The central part 55 of the spider member 50 has a hole 70 opened in its side opposite to the spherical surface 51. A depression pin 71 is fitted in the hole 70. A compression spring 72 is placed in the hole 70 so that the spring 72 causes the spherical head 73 of the depression pin 71 to abut against the internal bottom of the pot part and the spherical surface 51 to abut against the three-legged elastic member 69.

The roller races 65, 66 and 67 are formed in the cylindrical part of the pot part of the pot member 64 in such a manner that, as shown in FIG. 5, they are parallel with the axis of the pot member 64 to a predetermined point P, remote from the neutral point N, from the base point S, and are slightly inwardly bent over the distance between the predetermined point P and the top end point T. The bend of the top end region of the roller races as described above is called "one side modification of roller races."

Figures 8, 13:
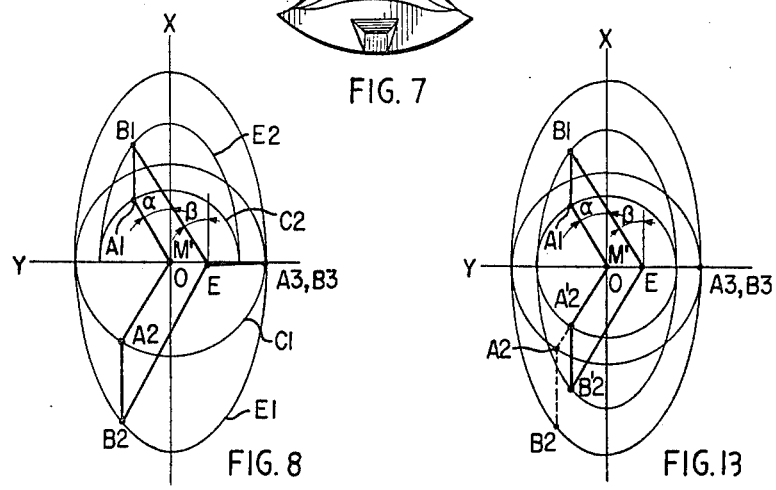
FIG. 8 is an explanatory diagram of the nonconstant velocity characteristic of the conventional tripod type constant velocity universal joint.
FIG. 13 is an explanatory diagram of the constant velocity characteristic of a tripod type constant velocity universal joint according to the invention.
Figure 9:
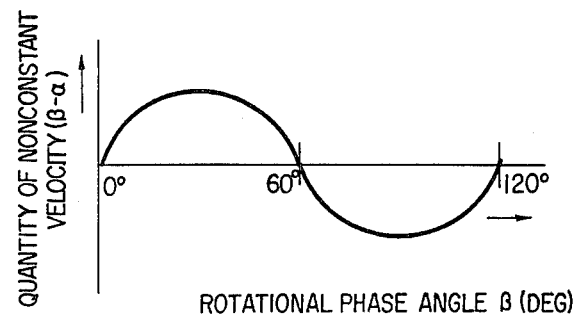
FIG. 9 is a graphical representation indicating the amount of nonconstant velocity of the conventional tripod type constant velocity universal joint.

In the roller races subjected to one side modification, the pitch diameter of the master circle thereof is not constant; that is, it is decreased at the end of the roller races. FIG. 8 is an explanatory diagram similar to that of FIG. 3. In FIG. 8, the rotational phase angle $\alpha$ of the pot member is 30°. In FIG. 8, reference character $C_1$ designates a master circle in the parallel part of the roller races, the master circle $C_1$ having a maximum pitch radius $R_0$ defined by the distance from the rotational axis of said pot member to the longitudinal axis of each pair of roller raceways; $C_2$ is a master circle at the top end part of the roller races, the master circle $C_2$ being smaller in diameter than the master circle $C_1$; $E_1$ is the slave ellipse of the master circle $C_1$; and $E_2$ the slave ellipse of the master circle $C_2$. FIG. 8 shows a state in which among three roller elements, two are engaged with the parallel part of the roller races and the remaining one is engaged with the bend part of the roller races; that is, the roller centers $A_2$ and $A_3$ are in the parallel part of the roller races, and the roller center $A_1$ is in the bend part of the same. In this case, the rotational phase angle $\alpha$ of the pot member is not equal to that $\beta$ of the spider member, and therefore the quantity of nonconstant velocity $(\beta - \alpha)$ is increased with increasing plane cross-angle $\gamma$; that is, the constant velocity characteristic is not maintained. The quantity of nonconstant velocity is fluctuated in a third order pattern of revolution as shown in FIG. 9.

The inventors have conducted intensive experimental study and mathematical analysis to reduce the quantity of nonconstant velocity of the tripod type constant velocity universal joint having the roller races subjected to one side modification and the quantity of nonconstant velocity of the other tripod type constant velocity universal joint, and found that satisfactory results can be obtained by symmetrically subjecting both sides of the roller races to modification along straight lines on within a predetermined quantity $\delta = 0.2R_o$ with the neutral point as its symmetrical point.

From the analysis of the inventors, if the approach quantity $\delta$ is beyond $0.2R_o$, the nonconstant velocity thereof increases so much as to affect the practical use.

Namely, each pair of roller raceways is modified so as to be inwardly inclined along straight lines on both sides thereof toward the rotational axis of a pot member by an approach quantity $\delta$, and the distances R between the longitudinal axis of each pair of roller raceways and the rotational axis of the pot member at both ends of the pair of roller raceways in the longitudinal direction are shorter than the distance $R_o$ therebetween at the central portion thereof within $\delta$ of $0.2R_o$. In the meantime, $\delta$ is an approach amount of the pair of roller raceways with respect to the rotational axis of the pot member and corresponding to the difference between $R_o$ and R (i.e., $\delta = R_o - R$). In the present invention, the approach quantity $\delta$ is selected within $0.2R_o$ so that the present invention reduces the nonconstant velocity to from 0.0117 to 0.0304 in the plane cross-angle $\gamma = 37°$ and to from 0.0128 to 0.0571 in the plane cross-angle $\gamma = 41°$.

By modifying the both sides of the roller raceways of the present invention as described above, an improved and practically useful universal joint can be provided. Thus modified joint has little nonconstant velocity quantity and can be easily assembled.

Figure 10:
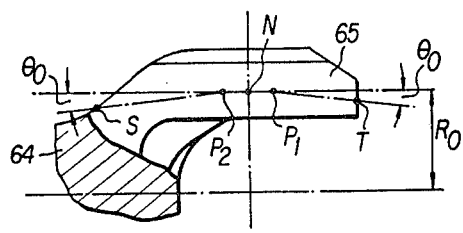
FIGS. 10 through 12 are sectional views of a part of a pot member, showing a roller race which is modified according to this invention.
Figure 11:
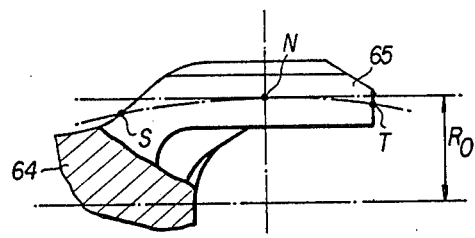
Figure 12:
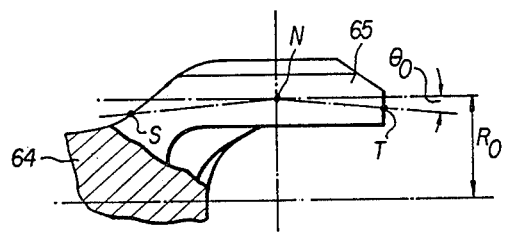

FIG. 10 to FIG. 12 are diagrams of a part of a pot member, showing a roller race (a pair of roller raceways) which is subjected to symmetrical both-side modification according to the invention. In one example of the pot member according to the invention shown in FIG. 10, the pair of roller raceways is in parallel with the axial line of the pot member 64 between points $P_1$ and $P_2$ which are equally spaced from the neutral point N of the pair of roller raceways in the opposite directions. The roller race (the pair of roller raceways) is inwardly bent at the points $P_1$ and $P_2$ in such a manner that the distance between the roller race and the axial line of the pot member 64 is shorter towards the top end point T on the top end side and the base point S on the base side than the parallel part of the roller race.

In a second example of the pot member shown in FIG. 11, the roller race is in the form of an arc which has its center on a line which is orthogonal with the axial line of the pot member and passes through the neutral point of the roller race. Accordingly, in this case also, the distance between the roller race and the rotational axis of the pot member 64 is the longest at the neutral point and is slightly shorter at the top end point T and the base point S.

In a third example shown in FIG. 12, the roller race is so inwardly bent that the distance between the roller race and the rotational axis of the pot member 64 is the longest at the neutral point N and is gradually shortened towards the top end point T and the base point S from the neutral point N.

In the case of the tripod type constant velocity universal joint having the roller races subjected to both-side modification according to the invention, an explanatory diagram similar to that in FIG. 8 is as shown in FIG. 13. In the case of the roller races subjected to one side modification, the roller centers are at the points $A_1$, $A_2$ and $A_3$ of the master circle of the roller races, and at the points $B_1$, $B_2$ and $B_3$ of the slave ellipse. On the other hand, in the case of the roller races subjected to both-side modification, the roller centers are at the points $A_1$, $A_2'$ and $A_3$ of the master circle of the roller races, and at the points $B_1$, $B_2'$ and $B_3$ of the slave ellipse, as shown in FIG. 13. As one of the roller centers is shifted from the point $A_2$ to the point $A_2'$ and from the point $B_2$ to the point $B_2'$, the points $A_1$ and $A_2'$ and the points $B_1$ and $B_2'$ are symmetrical with respect to a Y axis. Accordingly, the rotational phase angle $\alpha$ of the pot member is equal to that $\beta$ of the spider member; that is, the constant velocity characteristic is obtained. In general, as is clear from the above-described examples, the both-side symmetrical modification of a pair of roller raceways can cancel the nonconstant velocity (velocity fluctuation) characteristic attributing to the one side modification by decreasing the differences of the pitch radiuses of the portions at which two adjacent roller elements are respectively located in the pairs of roller raceways, (for example, one roller element being located at one bent portion of a pair of roller raceways, and the other roller element being located at the other bent portion thereof) and by increasing the frequency of the nonconstant velocity (velocity fluctuation) and the zero timings of the quantities of nonconstant velocity, and can greatly reduce the quantity of nonconstant velocity. The quantity of nonconstant velocity of the tripod type constant velocity universal joint having the roller races subjected to both-side symmetrical modification is fluctuated in a sixth order pattern of revolution.

In order to investigate the relation between the modification pattern of roller races and the general performance of a tripod type constant velocity universal joint, the inventors prepared six tripod type constant velocity universal joints with roller races which respectively have different modified patterns and compared differences in nonconstant velocity quantity, whirling quantity and roller stroke quantity attributed to differences in modification patterns with one another. The various data of the six tripod type constant velocity universal joints thus prepared are as indicated in FIG. 14.

The data indicated in Case 0 of FIG. 14 is for the conventional tripod type constant velocity universal joint having roller races subjected to one side modification. Case 1 corresponds to the example shown in FIG. 10. Case 2 corresponds to the example shown in FIG. 11. Cases 3 through 5 correspond to the example shown in FIG. 12. Each approach quantity $\delta$ of Cases 1 to 5 is as shown in the data of FIG. 14.

Figure 15:
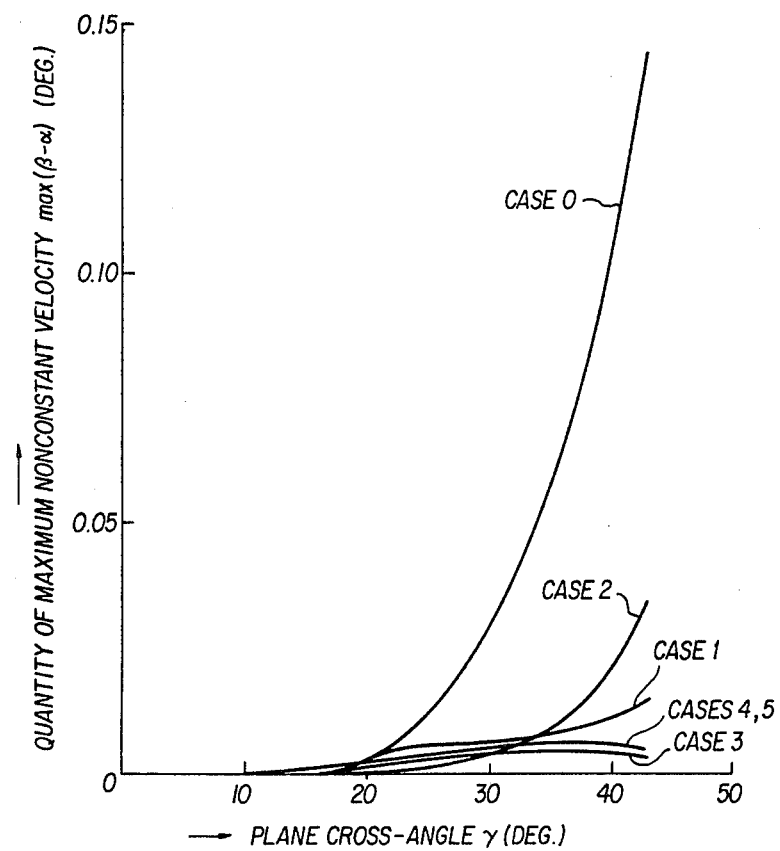
FIG. 15 is a graphical representation indicating maximum nonconstant quantity with respect to plane cross-angle in the conventional tripod type constant velocity universal joint and in the tripod type constant velocity universal joint of this invention.
Figure 16:
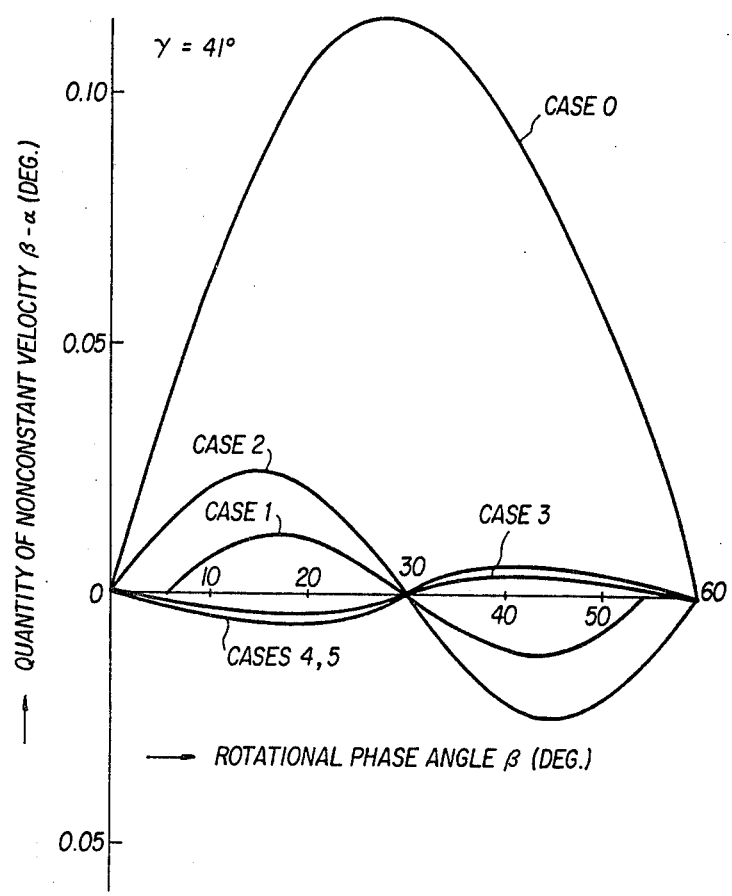
FIG. 16 is a graphical representation indicating nonconstant velocity quantity with respect to phase angle in the conventional tripod type constant velocity universal joint and in the tripod type constant velocity universal joint of the invention.

FIG. 15 is a graphical representation indicating quantities of maximum nonconstant velocity with respect to plane cross-angles $\gamma$ respectively according to the Cases. FIG. 16 is also a graphical representation indicating nonconstant velocity quantities with respect to rotational phase angles $\beta$ of the spider member with the plane cross-angle $\gamma=41°$, separately according to the Cases.

As is apparent from the curves in FIGS. 15 and 16, the conditions of a modification pattern preferably with respect to the constant velocity characteristic are as follows:

(1) It is preferable that the modification pattern is symmetrical with respect to the neutral point, i.e. the center of the joint of the roller race (note comparison of Case 0 with Cases 1 through 5).

(2) It is preferable that the modification pattern have no parallel part with respect to the rotational axis of the pot member (comparison of Case 1 with Case 4), because in Case 1, the pitch radius R of the parallel part having a predetermined length is maximum, and the differences of the pitch radiuses of the portions at which two adjacent roller elements are respectively located in the pairs of roller raceways are relatively increased in comparison with Case 4.

(3) It is preferable that the modification pattern is in the form of a straight line instead of an arc (comparison of Case 2 with Cases 1, 3, 4 and 5), because in Case 2 having arc shape roller raceways, tangential directions of the shape of the roller raceways at both end portions with respect to the rotational axis of the pot member become large, so that the differences of the pitch radiuses of the portions at which two adjacent roller elements are respectively located in the pairs of roller raceways are relatively increased in comparison with Cases 1, 3, 4 and 5.

(4) It is the most desirable that the quantity of the modification, i.e., the approach quantity $\delta$ of the pair of roller raceways with respect to the rotational axis of the pot member, becomes as small as possible, because in Case 3, the approach quantity $\delta$ is the shortest of all Cases, so that the differences of the pitch radius of the portions at which two adjacent roller elements are respectively located in the pairs of roller raceways are the most reduced. It is proper that the approach quantity $\delta$ is selected from the range of $\delta \leq 0.2R_0$ in view of the quantity of nonconstant velocity, size and easy assembling, wherein $R_0$ is a maximum pitch radius defined by the distance from the rotational axis of the pot member to the longitudinal axis of each pair of roller raceways.

Figure 19:
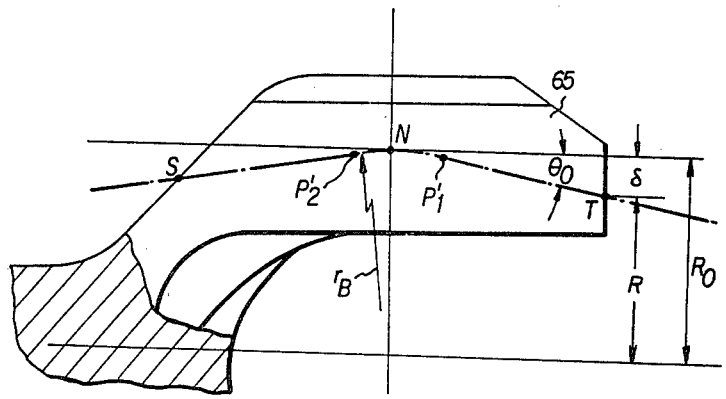
FIG. 19 is a sectional view of a part of a pot member, showing another modification of a roller race according to the present invention.

Furthermore, as shown in FIG. 19 each pair of roller raceways is provided along the arc line having a predetermined large radius $r_B$ of curvature and length and passing through the neutral point N of the pair of roller raceways, and is provided along the straight lines having a predetermined angle to the rotational axis of the pot member and connecting spaced points $P_1'$, $P_2'$ from the neutral point and both ends S, T of the pair of roller raceways, so that the approach quantity $\delta$ is shorter than that of Case 3 and the differences of the pitch radius of the portions at which two adjacent roller elements are respectively located in the pairs of roller raceways are further reduced than in Case 3.

Accordingly, the invention is intended to provide a tripod type constant velocity universal joint in which the roller races are subjected to slight both-side symmetrical modification with the neutral point as the symmetry point within a predetermined approach quantity $\delta$ thereby to greatly lower the conconstant velocity characteristic when compared with that of the conventional joint subjected to one side modification and the others.

Figure 17:
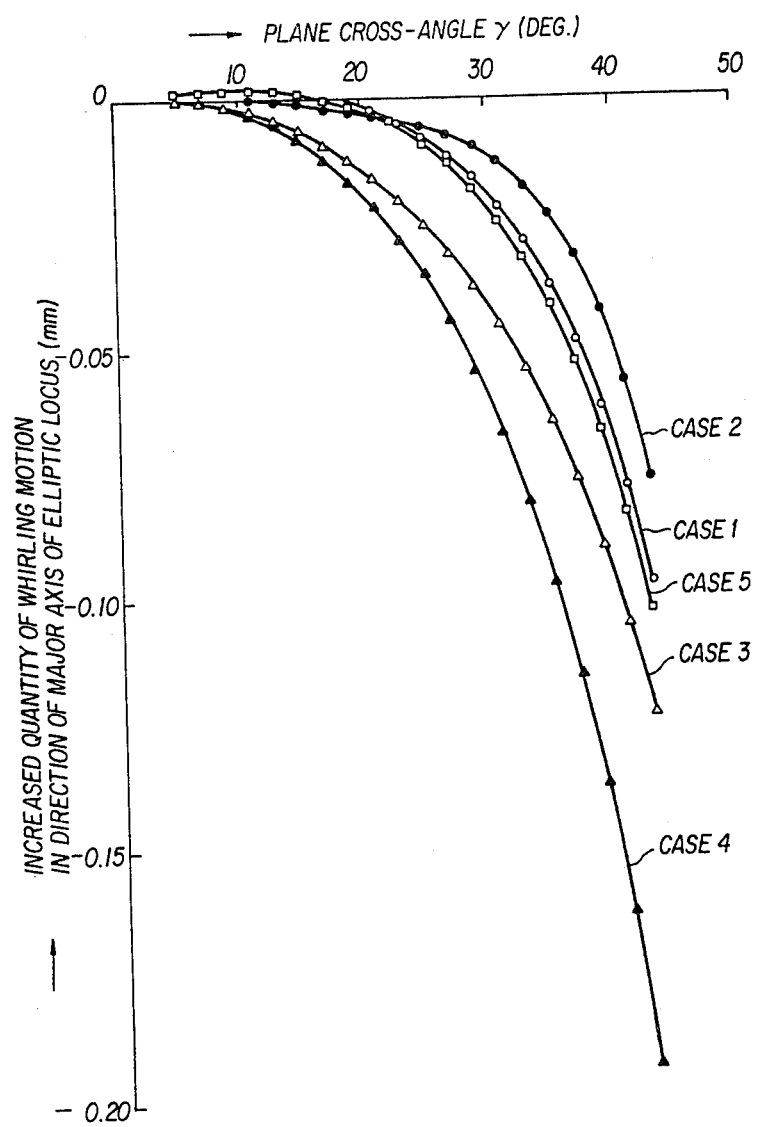
FIGS. 17 and 18 are graphical representations indicating increase in whirling quantity in the conventional tripod type constant velocity universal joint and in the tripod type constant velocity universal joint of the invention.
Figure 18:
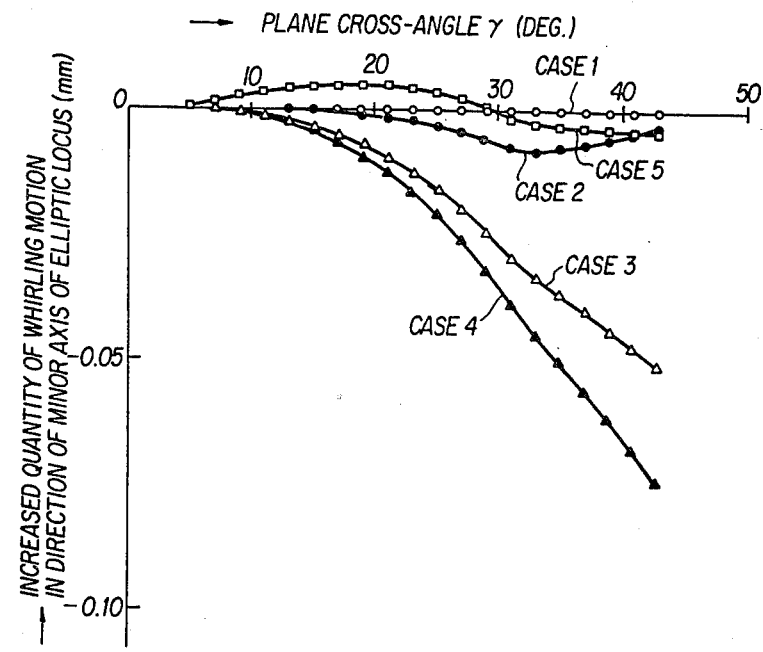

When one of the shafts of a tripod type constant velocity universal joint, for instance the pot shaft, is held at a fixed position, then the other shaft combined with said one shaft, i.e. the tripod shaft, makes a substantially elliptic motion around the joint center. In the conventional tripod type constant velocity universal joint (corresponding to Case 0 in FIG. 14), the tripod shaft is whirled three times every one revolution of the joint, and the whirling motion, or substantially elliptic motion, describes a substantially elliptic locus about 3.15 mm in major axis and 2.45 mm in minor axis. On the other hand, as seen in FIGS. 17 and 18, in the both-side modification type universal joint according to the invention, with the plane cross-angle $\gamma=41°$, the whirling quantity is decreased by about 0.055–0.165 mm in the direction of the major axis of the elliptic locus and by about 0–0.075 mm in the direction of the minor axis. The whirling motion forcibly generates vibration and noise. Accordingly, such vibration and noise can be decreased by reducing the whirling quantity. Furthermore, if the whirling quantity is reduced, then the inside diameter of the housing can be decreased as much, with the result that the universal joint can be designed to be small in size.

When a tripod type constant velocity universal joint is operated to form a plane cross-angle $\gamma$, then the roller elements are moved along the roller supporting rods with the rotation of the joint. The maximum and minimum values of the roller strokes and the stroke quantities in Cases 0 through 5 of FIG. 14 in this connection were obtained and are indicated in Table 1 below:

TABLE 1

| Case | Roller stroke | | |
|---|---|---|---|
| | Maximum value Smax (mm) | Minimum value Smin (mm) | ($\gamma = 41°$) Stroke quantity (Smax − Smin) (mm) |
| 0 | 29.58 | 16.75 | 12.83 |
| 1 | 27.71 | 16.83 | 10.88 |
| 2 | 27.752 | 16.804 | 10.948 |
| 3 | 27.570 | 16.836 | 10.734 |
| 4 | 26.946 | 16.883 | 10.063 |
| 5 | 27.672 | 17.338 | 10.334 |

The term "maximum value" is intended to mean the distance between the roller center and the base of the roller supporting rod obtained when the roller element is positioned closest to the top end of the roller supporting rod; the term "minimum value" is intended to mean the distance between the roller center and the base of the roller supporting rod obtained when the roller element is positioned closest to the base of the roller supporting rod; and the term "stroke quantity" is intended to mean a value obtained by subtracting the minimum value from the maximum value.

The comparison in roller stroke quantity between the conventional universal joint (Case 0) and the universal joint of the invention (Cases 1 through 5) is as follows: the roller stroke quantity of each of the universal joints of the invention is smaller than that of the conventional one. Especially in Case 4, the roller stroke quantity of the universal joint of the invention is smaller by about 20% than that of the conventional one. If the maximum value of the roller stroke is reduced, the inside diameter of the housing can be decreased. If the minimum value of the roller stroke is increased, the positions of the end faces of the central part 55 of the spider member can be shifted outwardly as much, whereby the area of the spherical surface of the spider member can be increased, with the result that the three-leg elastic member rarely comes apart from the spherical surface, and the maximum operating joint angle can be increased.

When the universal joint is operated to form a plane cross-angle $\gamma$, the roller elements are rotatably moved along the roller races by the rotation of the joint. In this connection, the amounts of movement of the roller elements were obtained respectively according to Cases 0 through 5 in FIG. 14 and are indicated in the following Table 2:

TABLE 2

| Case | Movement | | |
|---|---|---|---|
| | Maximum value (mm) | Minimum value (mm) | Amount of ($\gamma = 41°$) movement (mm) |
| 0 | 18.192 | −19.406 | 37.598 |
| 1 | 18.184 | −18.184 | 36.368 |
| 2 | 18.207 | −18.207 | 36.414 |
| 3 | 18.088 | −18.088 | 36.176 |
| 4 | 17.678 | −17.678 | 35.356 |
| 5 | 18.154 | −18.154 | 36.308 |

In Table 2, the maximum values and the minimum values are indicated in such a manner that, with the neutral point of the roller races as zero, they are positive values and negative values respectively when the roller elements are moved from the neutral point toward the top end side and when moved towards the base side.

A comparison in roller element movement amount between the conventional universal joint (Case 0) and the universal joints of the invention (Cases 1 through 5) is as follows: the amount of movement of any one of the universal joints of the invention is smaller than that of the conventional one. This will reduce the number of times where there is a chance that the roller elements will be removed from the respective roller races, and it furthermore suggests the possibility that the universal joint can be so designed as to be small in size and light in weight. In addition, the above-described effect means that, in the case where the size of the universal joint is predetermined, the maximum operating joint angle of the universal joint can be increased, so that the rotation radius of the front driven vehicle can be decreased.

When a tripod type constant universal joint is operated to form a plane cross-angle, the roller elements are rotated with the supporting rods of the joint. The quantities of maximum nonconstant velocity with respect to each plane cross-angle $\gamma$ were obtained respectively according to four examples represented by FIGS. 11, 12, 10, 19 and indicated in FIG. 20.

In each example shown in this FIG. 20, the maximum pitch radius $R_o$ is 19.9 mm and the approaching quantity $\delta$ is 0.2 $R_o$, i.e. 3.98 mm.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A tripod type constant velocity universal joint comprising:
   a driving part having an axis of rotation;
   a driven part having an axis of rotation;
   a spider member, integral with one of said parts, having a concentrated portion and three roller supporting rods extended radially from said concentrated portion thereof with an angle of 120 degrees formed therebetween;
   three roller elements respectively rotatably supported on said roller supporting rods and slidable along said roller supporting rods in the axial directions of said rods; and
   a pot member, integral with the other of said parts, defining three pairs of longitudinal roller raceways and respectively receiving said three roller elements between said pairs of roller raceways, each pair of roller raceways having a top end side and a base side with a central portion therebetween along a longitudinal axis thereof,
   said longitudinal axis of said each pair of roller raceways having an internal surface approaching, along straight lines, a rotational axis of said pot member on both of said top end side and said base side, and the distances R between the longitudinal axis of said each pair of roller raceways and the rotational axis of said pot member on said both sides being shorter than the distance $R_o$ therebetween at said central portion thereof, and
   said longitudinal axis of said each pair of roller raceways being symmetrically configured with respect to a central point in said central portion of each said pair of roller raceways in their longitudinal direction, said central point being a symmetry point,
   whereby an approach quantity $\delta$ of the longitudinal axis of said roller raceways, defined by the difference between said distances Ro and R at both ends thereof, with respect to the rotational axis of said pot member, and the variation of the approach quantity in response to the position of said roller elements moving in the longitudinal axis of said roller raceways, are decreased by said straight lines, thereby decreasing the quantity of nonconstant rotational velocity thereof and decreasing the length thereof in their longitudinal direction to reduce the size and weight thereof.

2. A tripod type constant velocity universal joint according to claim 1, wherein:
each pair of roller raceways gradually approaches the rotational axis of said pot member along straight lines in the longitudinal direction from said central portion to both ends of said pair of roller raceways.

3. A tripod type constant velocity universal joint according to claim 1, wherein:
each pair of roller raceways is in parallel with respect to the rotational axis of said pot member between points which are equally spaced from said central point on both sides thereof in the longitudinal direction thereof, and
each pair of roller raceways gradually approaches the rotational axis of said pot member along straight lines from said spaced points to both ends of said pair of roller raceways.

4. A tripod type constant velocity universal joint according to claim 2, wherein:
each pair of roller raceways is provided along two straight lines having predetermined angles $\theta_o$ to the rotational axis of said pot member but with opposite senses and connecting said central point and both ends of said pair of roller raceways.

5. A tripod type constant velocity universal joint according to claim 3, wherein:
each pair of roller raceways is provided along two straight lines having predetermined angles $\theta_o$ to the rotational axis of said pot member but with opposite senses and connecting said spaced points and both ends of said pair of roller raceways.

6. A tripod type constant velocity universal joint according to claim 1, wherein:
each pair of roller raceways is provided along an arc line having a predetermined radius r of curvature and a length passing through a central point of the pair of roller raceways between points which are equally spaced from said central point on both sides thereof in the longitudinal direction thereof, and is also provided along said two straight lines having a predetermined angle $\theta_o$ to the rotational axis of said pot member and connecting said spaced points from said neutral point and both ends of said pair of roller raceways.

7. A tripod type constant velocity universal joint according to claim 4, wherein:
said angle $\theta_o$ of said straight lines of said pair of roller raceways is 4.645°.

8. A tripod type constant velocity universal joint according to claim 4, wherein:
said angle $\theta_o$ of said straight lines of said pair of roller raceways is 6.2°.

9. A tripod type constant velocity universal joint according to claim 5, wherein:
said angle $\theta_o$ of said straight lines of said pair of roller raceways is 6.2°.

10. A tripod type constant velocity universal joint according to claims 7 or 8 wherein:
said distance $R_o$ defined by the distance from the rotational axis of said pot member to the longitudinal axis of each pair of roller raceways is 19.9 mm.

11. A tripod type constant velocity universal joint according to claim 8, wherein:
said distance $R_o$ defined by the distance from the rotational axis of said pot member to the longitudinal axis of each pair of roller raceways is 20.436 mm.

12. A tripod type constant velocity universal joint according to claim 2, wherein
an arc line is formed in the intersecting portion of said straight lines in said roller raceways and smoothly connects to said straight lines.

13. A tripod type constant velocity universal joint according to claim 3 wherein
an arc line is formed in the intersecting portion of said straight lines in said roller raceways and smoothly connects to said straight lines.

14. A tripod type constant velocity universal joint according to claim 1, wherein
the relative sliding of said driving part and driven part in the axial direction thereof is prevented by fixing means so that they do not relatively slide in the axial direction thereof.

* * * * *

UNITED STATES PATENT AND TRADEMARK OFFICE
CERTIFICATE OF CORRECTION

PATENT NO. : 4,421,494
DATED : December 20, 1983
INVENTOR(S) : Yoshisumi Futamura et al It is certified that error appears in the above-identified patent and that said Letters Patent is hereby corrected as shown below:

On the title page

--[73] Toyota Jidosha Kogyo Kabushiki Kaisha and Kabushiki Kaisha Toyota Chuo Kenkyusho --

Signed and Sealed this

Twenty-third Day of October 1984

[SEAL]

Attest:

GERALD J. MOSSINGHOFF

Attesting Officer — Commissioner of Patents and Trademarks